April 27, 1965   E. W. PARLASCA ETAL   3,180,662
TUBE COUPLING HAVING A SPRINGY METALLIC GASKET
Filed July 10, 1958
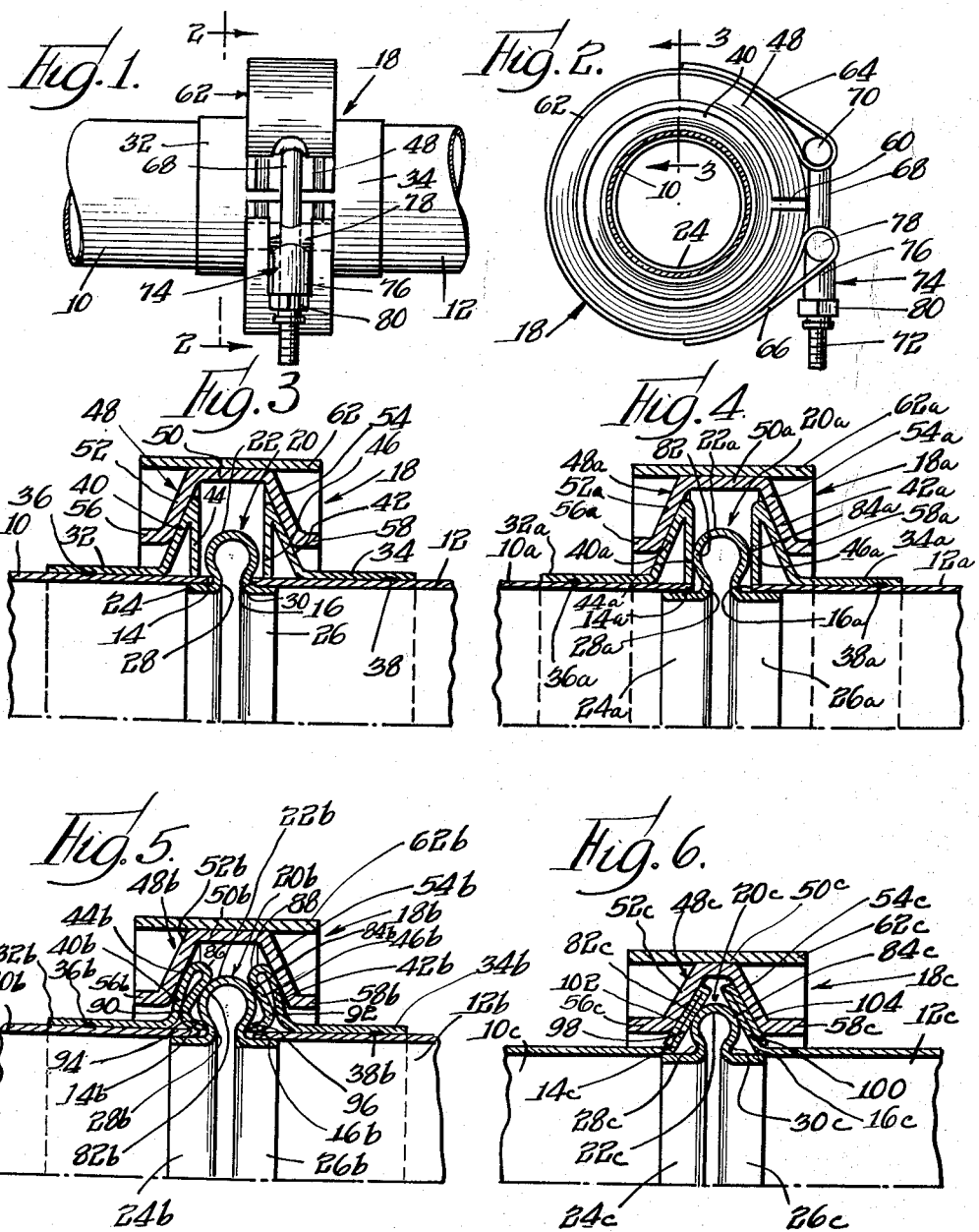
INVENTORS
Edwin W. Parlasca
Raymond C. Andersen
By: Olson & Trexler attys.

United States Patent Office 3,180,662
Patented Apr. 27, 1965

3,180,662
TUBE COUPLING HAVING A SPRINGY
METALLIC GASKET
Edwin W. Parlasca, Elgin, and Raymond C. Andersen,
Lombard, Ill., assignors to Flexonics Corporation, Maywood, Ill., a corporation of Illinois
Filed July 10, 1958, Ser. No. 747,633
4 Claims. (Cl. 285—95)

This invention is concerned with a coupling of the type used for joining sections of air bleed tubes, duct assemblies, and the like, particularly as used in aircraft construction.

For a great many years, it has been common practice to join tubes, ducts, pipes and the like by means of bolted flanges. In the aircraft and missile field, where weight and space are extraordinarily important considerations, such bolted flanges often cannot be used. Various types of couplers have been developed as substitutes. Such couplers generally require the use of a gasket, and are difficult to install. Any misalignment causes leakage, and removal and reinstallation without the use of a new gasket is generally impossible. This invention is concerned with a coupler for joining duct assemblies and the like as in the aircraft and missile field, but overcoming the difficulties of prior constructions in this field.

Accordingly, it is an object of this invention to provide a coupling device for duct assemblies, tubes and the like which can be readily installed, and which, furthermore, can be removed and reinstalled without detrimental effects.

In addition, it is an object of this invention to provide a coupling for duct assemblies, tubing and the like which is self-aligning.

Yet another object of this invention is to provide such a coupling which utilizes internal pressure to increase the seal pressure.

Yet another object of this invention is to provide a coupling of the type heretofore set forth which will form a proper seal with some degree of angular misalignment of the parts joined, or which will allow a slight angular motion of such parts.

Other and further objects and advantages of the present invention will be apparent from the following description when taken in connection with the accompanying drawings, wherein:

FIG. 1 is a side view of a coupling constructed in accordance with the present invention;

FIG. 2 is an end view of the coupling as taken along the line 2—2 in FIG. 1, the associated tube being shown in cross section;

FIG. 3 is a longitudinal sectional view on an enlarged scale as taken along the line 3—3 in FIG. 2;

FIG. 4 is a view similar to FIG. 3 showing a modification of the invention;

FIG. 5 is another view similar to FIG. 3 showing a further modification of the invention; and FIG. 6 is yet another view similar to FIG. 3 showing yet another modification of the invention.

Referring now in greater particularity to the drawings, and first to FIGS. 1-3, there will be seen a pair of ducts or tubes 10 and 12 disposed in axial alignment and having confronting, spaced apart ends 14 and 16, respectively. The tubes typically are of sheet metal construction, and are joined by a coupling indicated at 18, the coupling also typically being of sheet metal construction.

The coupling comprises a gasket 20 of the convoluted, specifically nodoid type. This gasket comprises a toroidal body 22, and as is typical with the nodoid convolution, the body has a substantially circular cross section. Accordingly, internal pressure merely tends to stretch or distend the body without substantially distorting it. The body is provided with a pair of oppositely extending cylindrical flanges 24 and 26 respectively, joined to the body at roots 28 and 30, respectively. The flange 24 fits within the tube end 14 with the tube end impinging against the root 28. Similarly, the flange 26 fits within the tube end 16 with the tube end impinging against the root 30.

The coupling 18 further includes a pair of sleeves or collars 32 and 34, respectively, of cylindrical configuration welded to the tubes 10 and 12 as at 36 and 38, respectively. These sleeves or collars are provided with outwardly directed frusto-conical bearing or cam flanges 40 and 42, the oppositely outwardly facing surfaces of which are inclined at obtuse angles to the associated tube. Integral radial discs or plates 44 and 46 extend inwardly from the extremities of the cam flanges 40 and 42 and abut the respective tubes 10 and 12 spaced short of the corresponding tube ends 14 and 16. The discs 24 and 26 brace the cam flanges 40 and 42 against deflection toward the ends of the tubes.

The coupling 18 further includes a clamping ring designated generally by the numeral 48. The clamping ring comprises a cylindrical web 50 and a pair of angularly disposed, generally frusto-conical flanges 52 and 54. These two flanges are respectively complementary to the cam flanges 40 and 42, and bear against the outer surfaces thereof. The flanges 52 and 54 are provided with integral cylindrical flanges 56 and 58 in order to render the inclined or frusto-conical flanges rigid. The clamping ring 48 is split or interrupted as at 60, see FIG. 2.

Finally, the coupling includes a flexible strap 62, which may, for example, be made of stainless steel. The ends of the strap 62 are bifurcated, and are folded back upon themselves as at 64 and 66, being spot welded to the adjacent portions of the strap. A T-bolt 68 has the cross member 70 thereof secured within the bifurcated strap end 64, and the end of the shank of the T-bolt extends past the other end 66 of the strap and is threaded at 72. A T-shaped sleeve 74 has a hollow stem or shank 76 through which the threaded shank 72 projects, and the cross member 78 thereof is held by the bifurcated strap end 66. A nut 80, preferably of the self-locking variety, is threaded on the end of the shank 72 to draw up the ends of the strap 62, and hence to force the clamping ring 48 in against the cam flanges 40 and 42. This action forces the tube ends 14 and 16 toward one another, and hence tightly in against the roots 28 and 30 to form a tight seal therewith. Upon the application of internal fluid pressure, the body 22 of the convoluted gasket tends to expand, as is typical of nodoid structures, and this causes the roots 28 and 30 to press out more aggressively against the tube ends 14 and 16, thereby to make the seal even tighter than originally.

A modification of the invention is shown in FIG. 4. The parts in FIG. 4 are generally similar to those in FIG. 3, and similar parts are identified by similar numerals with the addition of the suffix "a". Repetition of description therefore is unnecessary. The distinguishing features of FIG. 4 relative to FIGS. 1-3 reside in the position of the cam flanges 40a, 42a and the reinforcing discs 44a, 46a relative to the ends 14a, 16a of the tubes 10a, 12a. As will be observed, the discs 44a and 46a are positioned at the ends 14a and 16a of the respective tubes. Accordingly, these ends do not impinge against the roots 28a and 30a. Rather, the discs 44a and 46a engage the side walls of the body 22a at 82 and 84. Thus, there is a side wall seal rather than a root seal. Otherwise, the action of the couplings 18 and 18a is the same. An expansion of the nodoid gasket causes the side walls 82 and 84 to impinge more tightly against the discs 44a and 46a than when originally installed.

The embodiment of the invention shown in FIG. 5 incorporates both a root seal and a side seal. Both parts are similar to those heretofore shown and described, and similar numerals are utilized for identification with the addition of the suffix "b." The cam flanges 40b and 42b are similar to those previously disclosed, but are curved longitudinally, being somewhat convex toward the corresponding clamping ring flanges 52b and 54b. These cam flanges are rolled over respectively at 86 and at 88 to form gasket engaging surfaces 44b and 46b respectively engaging the side walls at 82b and 84b, then moving away from the side walls as at 90 and 92, into engagement with the cam flanges 40b and 42b, and subsequently being redirected toward one another to provide end sections 94 and 96 confronting one another, and projecting beyond the respective tube ends 14b and 16b, and into engagement with the roots 28b and 30b. The gasket engaging surfaces 44b and 46b will be seen to resemble the letter S, with the gasket engaging portions thereof concave toward the gasket. The seal in this embodiment of the coupler comprises both a root seal and a side seal, and both the root seal and the side seal are made more aggressive upon distension of the convoluted or nodoid gasket as a result of internal pressure.

A further embodiment of the invention which operates on the side seal principle is shown in FIG. 6. Most of the parts are similar, and the same numbers are used as heretofore with the addition of the affixed "c." The distinguishing feature in this instance is that the tubes 10c and 12c are respectively provided at their ends 14c and 16c with outwardly directed frusto-conical extensions 98 and 100 bearing against the body 22c at side wall positions indicated at 82c and 84c. The flanges preferably are folded over as at 102 and 104 for increased strength and rigidity, and the folded over flanges are engaged by the flanges 52c and 54c of the clamping ring 48c.

Several advantages are attendant upon all of the various forms of the invention as herein shown and described. The convoluted gasket with oppositely extending flanges or necks provides for self-alignment of the gasket and of the confronting duct or tube ends. Thus, it is practically impossible to misinstall or misalign the coupling.

The convoluted gasket, which may be fabricated from welded or seamless tubing in accordance with known principles, utilizes internal pressure to increase the seal pressure. The internal pressure acting on the single convolution tends to extend the convolution, thereby increasing the loading on the sealing surface. Thus, the internal pressure helps to effect the seal proportional to the internal pressure.

The joint can be coupled and uncoupled as may be necessary and still retain its full efficiency.

The joint or coupling is flexible in that the convoluted gasket has an inherent spring rate and is compressed upon installation. Thus, a seal may be obtained with angular misalignment or with slight angular motion between the adjacent duct or tube ends.

The specific examples of the invention as herein shown and set forth are to be understood as being for illustrative purposes only. Various changes in structure will no doubt occur to those skilled in the art, and will be understood as forming a part of the invention insofar as they fall within the spirit and scope of the appended claims.

The invention is claimed as follows:

1. A disconnectable conduit joint comprising, in combination, two conduit elements having adjacent ends disposable in opposed mutual alignment, a reusable sealing gasket formed of an impervious annular band of springy metal and having opposite marginal edges shaped to form retaining flanges coacting with adjacent ends of said respective conduit elements to assure mutual concentric alignment of said band and said elements, the medial portion of said band intervening between said flanges being shaped into a hollow annular head continuously holding said marginal edges of the band in spaced relation to each other and extending radially outward from said marginal edges in a bulbous form which defines an annular pressure cavity opening radially inward between said marginal edges and having a maximum width along the axis of the gasket which substantially exceeds the width of the space between said marginal edges, annular sealing abutment means on adjacent ends of said conduit elements shaped to engage and seal against opposite sides of the bulbous annular portion of said gasket, inclined cam elements on said adjacent ends of said conduit elements, releasable clamping band means coacting with said cam elements for holding said conduit elements together and urging said abutment means firmly against said gasket with a force which is limited to preclude stressing of said gasket beyond its elastic limit, and said band being free of a fused metal to metal connection with structure on either of said conduit elements to provide for easy removal of the band from both conduit elements upon disassembly of the joint.

2. A separable joint comprising, in combination, two conduit elements disposable with adjacent ends in opposed mutual alignment, a reusable sealing gasket formed of an impervious annular band of springy metal having opposite marginal edges extending radially inward and shaped to extend into adjacent ends of said respective conduit elements to hold the gasket in concentric alignment therewith, the medial portion of said band intervening between said edges thereof being shaped in transverse section to have a bulbous form extending radially outward to define an annular pressure cavity and to continuously hold said marginal band edges in spaced relation to each other, means on said respective conduit elements defining a pair of opposed annular abutment surfaces generally straight in transverse section and engaging opposite sides of said medial bulbous portion of said band to have line contact therewith for forming seals between the abutment surfaces and the band, releasable clamping means for holding said abutment surfaces against opposite sides of said gasket with a force limited to preclude deformation of said band beyond its elastic limit, said marginal edges of said band being supported against movement toward each other only by the intervening bulbous portion of the band, and said band being free of a fused metal to metal connection with structure on either of said conduit elements to provide for easy removal of the band from both conduit elements upon disassembly of the joint.

3. A separable joint comprising, in combination, two thin walled conduit elements disposed with adjacent ends in opposed generally coaxial alignment with each other, a reusable sealing gasket formed of an impervious annular band of springy metal and having opposite marginal edges shaped to form retaining flanges which fit within the adjacent ends of the respective conduit elements to hold the gasket in concentric alignment therewith, the medial portion of said band intervening between said marginal edges thereof being shaped in transverse section to have a bulbous form extending radially outward to define an annular pressure cavity opening radially inward between said marginal edges of the band, said medial portion of the band having a maximum width along the axis of the band which substantially exceeds the corresponding axial width of the band between the bases of said flanges, cam means mounted on each of said conduit elements, releasable clamping band means coacting with said cam means on both conduit elements for moving said conduit elements axially toward each other, said cam means being positioned in relation to each of said respective conduit elements to effect engagement of the extreme ends of the conduit elements with opposite sides of said medial portion of said band adjacent the junctures of said medial band portion with said opposite flange forming edges of the band, engagement of said band with coacting structure being confined to contact of the band with the adjacent ends of said thin walled conduit elements, and said band having a uniform thickness throughout the extent thereof and being free of a fused metal-to-metal connection with structure on either of said conduit elements to provide for easy removal of the band from both conduit elements upon disassembly of the joint.

4. A separable joint comprising, in combination, two thin walled conduit elements disposed with adjacent ends in opposed generally coaxial alignment with each other, a reusable sealing gasket formed of an impervious annular band of springy metal and having opposite marginal edges shaped to form retaining flanges which fit within the adjacent ends of the respective conduit elements to hold the gasket in concentric alignment therewith, the medial portion of said band intervening between said marginal edges thereof being shaped in transverse section to have a bulbous form extending radially outward to define an annular pressure cavity opening radially inward between said marginal edges of the band, said medial portion of the band having maximum width along the axis of the band which substantially exceeds the corresponding axial width of the band between the bases of said flanges, means on each of said conduit elements defining an annular abutment confronting said band outwardly of said flanges, cam means mounted on each of said conduit elements, releasable clamping band means coacting with said cam means on both conduit elements for moving said conduit elements axially toward each other to effect engagement of abutments on the respective conduit elements with said medial portion of the band, each of said abutments being shaped in relation to said medial portion of the band to confine engagement of the abutments with the band basically to line contact, and said band being free of a fused metal-to-metal connection with structure on either of said conduit elements to provide for easy removal of the band from both conduit elements upon disassembly of the joint.

References Cited by the Examiner
UNITED STATES PATENTS

| | | | |
|---|---|---|---|
| 381,869 | 4/88 | Williams | 285—368 |
| 1,236,816 | 8/17 | Behan | 277—206 |
| 1,359,142 | 11/20 | Allison. | |
| 2,211,983 | 8/40 | Parris | 285—364 |
| 2,318,006 | 5/43 | Mercier | 285—412 |
| 2,635,900 | 4/53 | Mayo | 285—367 |
| 2,739,828 | 3/56 | Schindler | 285—229 |
| 2,761,707 | 9/56 | Herman | 285—367 |
| 2,769,648 | 11/56 | Herman | 285—366 |
| 2,770,259 | 11/56 | Zallea | 285—229 |
| 2,852,282 | 9/58 | Smisko | 285—365 |
| 2,896,978 | 7/59 | Schumacher | 285—408 |
| 2,969,998 | 1/61 | Rodaway | 277—206 |

FOREIGN PATENTS

| | | |
|---|---|---|
| 557,639 | 8/32 | Germany. |
| 812,863 | 9/51 | Germany. |
| 911,682 | 3/46 | France. |
| 1,024,824 | 1/53 | France. |
| 357,806 | 3/38 | Italy. |
| 43,424 | 6/38 | Netherlands. |

CARL W. TOMLIN, *Primary Examiner.*
ARTHUR B. MILLER, *Examiner.*